(12) United States Patent
Shimizu (10) Patent No.: US 7,502,153 B2
(45) Date of Patent: Mar. 10, 2009

(54) IMAGE DISPLAY APPARATUS

(75) Inventor: Yoshie Shimizu, Ibaraki (JP)

(73) Assignee: Konica Minolta Holdings, Inc., Tokyo (JP)

( * ) Notice: Subject to any disclaimer, the term of this patent is extended or adjusted under 35 U.S.C. 154(b) by 353 days.

(21) Appl. No.: 11/168,586

(22) Filed: Jun. 28, 2005

(65) Prior Publication Data

US 2006/0001977 A1     Jan. 5, 2006

(30) Foreign Application Priority Data

Jul. 1, 2004     (JP)     ............ 2004-195428

(51) Int. Cl.
*G03H 1/00*     (2006.01)
*G02B 5/32*     (2006.01)

(52) U.S. Cl. ............ 359/13; 359/15; 359/630
(58) Field of Classification Search ............ 359/13, 359/15, 630, 634
See application file for complete search history.

(56) References Cited

U.S. PATENT DOCUMENTS 4,560,233 A * 12/1985 Banbury ............ 345/7
5,305,124 A * 4/1994 Chern et al. ............ 359/13
7,023,592 B2 * 4/2006 Noda et al. ............ 359/15

FOREIGN PATENT DOCUMENTS

| JP | 06-326945 A | 11/1994 |
| JP | 2000-298237 A | 10/2000 |
| JP | 2000-330069 A | 11/2000 |
| JP | 2001-264681 A | 9/2001 |

* cited by examiner

*Primary Examiner*—Audrey Y Chang
(74) *Attorney, Agent, or Firm*—Sidley Austin LLP

(57) ABSTRACT

In an image display apparatus, two light sources emit illumination light having different wavelengths, with which a liquid crystal display device is illuminated. By modulating the illumination light, the liquid crystal display device produces a first and a second image light having different wavelengths. Two holographic optical elements respectively reflect the first and second image lights and direct them to the user's eye so that virtual images of the images represented by the first and second image lights are formed at different positions. As the light source from which to obtain the illumination light is switched between the two, the dioptric power with which to present an image is changed.

15 Claims, 6 Drawing Sheets

IMAGE DISPLAY APPARATUS

This application is based on Japanese Patent Application No. 2004-195428 filed on Jul. 1, 2004, the contents of which are hereby incorporated by reference.

BACKGROUND OF THE INVENTION

1. Field of the Invention

The present invention relates to an image display apparatus that is worn on the user's head so as to be used in front of the user's eyes. More particularly, the present invention relates to an image display apparatus that allows simultaneous observation of a displayed image and of the outside world.

2. Description of Related Art

Head-worn image display apparatuses of the type worn on the head so as to be used in front of the eyes have been becoming increasingly popular as image display apparatuses for personal use. It is preferable that such image display apparatuses be made compact and lightweight.

For this reason, such image display apparatuses are typically built with a small display device in combination with an observation optical system that presents an enlarged virtual image of the image displayed on the display device. Moreover, it is preferable that such image display apparatuses be so designed that the distance from the eyes to the presented image (virtual image) is variable to allow the user to observe the image with a dioptric power that suits the user.

Head-worn image display apparatuses that allow the dioptric power to be varied are proposed, for example, in the patent publications cited below.

Patent Publication 1: Japanese Patent Application Laid-open No. 2001-264681
Patent Publication 2: Japanese Patent Application Laid-open No. 2000-330069
Patent Publication 3: Japanese Patent Application Laid-open No. 2000-298237
Patent Publication 4: Japanese Patent Application Laid-open No. H6-326945

In the image display apparatus proposed in Japanese Patent Application Laid-open No. 2001-264681 (laid-open on Sep. 26, 2001), the dioptric power is varied by moving along the optical axis an optical element provided in an observation optical system.

In the image display apparatus proposed in Japanese Patent Application Laid-open No. 2000-330069 (laid-open on Nov. 30, 2000), a prism having a free-form surface is used as an observation optical system, and the dioptric power is varied by varying the distance between the prism and a display device.

In the image display apparatus proposed in Japanese Patent Application Laid-open No. 2000-298237 (laid-open on Oct. 24, 2000), a variable-shape mirror is used as part of an observation optical system, and the dioptric power is varied by varying the shape of the mirror.

In the image display apparatus proposed in Japanese Patent Application Laid-open No. H6-326945 (laid-open on Nov. 25, 1994), a liquid crystal lens of which the refractive index varies according to the voltage applied thereto is used as part of an observation optical system, and the dioptric power is varied by varying the refractive index of the liquid crystal lens.

In recent years, there have also been proposed so-called "see-through" image display apparatuses that allow simultaneous observation of an image and of the outside world. A see-through image display apparatus can be worn all the time in daily life, and thus allows the user to be in touch with information all the time. This makes see-through image display apparatuses useful. For example, during a lecture, the contents of the speech can be presented in the form of images so that hearing-impaired people can easily understand them.

The problem here is that the part on which the user focuses his or her attention in the outside world changes constantly. As the focus of the user's attention changes, the observation distance varies greatly. Thus, if the presented image is presented with a fixed dioptric power, the dioptric powers appropriate for the observation of the outside world and of the image tend to differ greatly from each other. This greatly strains the user's eyes.

For this reason, in see-through image display apparatuses, it is particularly important that an image be presented with a variable dioptric power. It is especially preferable that the dioptric power with which the image is presented be switched quickly as the observation distance changes.

Certainly it is possible to achieve a variable dioptric power in a see-through image display apparatus on the basis of the conventional techniques proposed in the patent publications mentioned above. Doing so, however, has the following disadvantages. With image display apparatuses like those proposed in Japanese Patent Applications Laid-open Nos. 2001-264681 and 2000-330069, where a particular optical element needs to be moved mechanically, it is necessary to provide a drive mechanism and a mechanical power source. This makes it difficult to realize a compact, lightweight image display apparatus.

With image display apparatuses like that proposed in Japanese Patent Application Laid-open No. 2000-298237, where a variable-shape mirror is used, it is necessary to provide an arithmetic processor, a drive circuit, and the like for controlling the shape of the mirror. This makes it difficult to realize a compact, lightweight image display apparatus.

With image display apparatuses like that proposed in Japanese Patent Application Laid-open No. H6-326945, where a liquid crystal lens is used, it is difficult to design a flat optical system, and in addition it is necessary to provide a controller for controlling the applied voltage. This makes it difficult to realize a compact, lightweight image display apparatus. Moreover, using a special and thus expensive optical element like a variable-shape mirror or a liquid crystal lens results in an accordingly expensive image display apparatus.

SUMMARY OF THE INVENTION

In view of the conventionally experienced inconveniences discussed above, it is an object of the present invention to provide a head-worn image display apparatus that can present an image with a variable dioptric power but that nevertheless can easily be made compact and lightweight.

To achieve the above object, according to the present invention, an image display apparatus worn on a head of a user is provided with: a display that operates either in a first state in which the display displays an image with a first light and a second state in which the display displays an image with a second light having a different wavelength from the first light; a first holographic optical element that directs the first light from the display to an eye of the user so that a virtual image of the image represented by the first light is presented at a first distance from the eye of the user; a second holographic optical element that directs the second light from the display to the eye of the user so that a virtual image of the image represented by the second light is presented at a second distance from the eye of the user; and a controller that switches the display between the first and second states.

In this image display apparatus, depending on whether the display is in the first or second state, the wavelength of the light with which an image is presented differs, and the distance from the user's eye to the virtual image differs. In this way, the dioptric power with which the image is presented can be switched according to the state of the display.

Moreover, the switching of the dioptric power is achieved by turning light sources of display on and off, thus without the need for a mechanical drive mechanism or a special optical element. Moreover, since holographic optical elements are thin and lightweight, it is possible to realize a compact, lightweight apparatus. In addition, the dioptric power can be switched instantaneously.

Incidentally, holographic optical elements exploit diffraction of light, and thus exhibit high wavelength selectivity. This allows the first and second holographic optical elements to act only on the first and second lights respectively.

That is, an image display apparatus according to the present invention can present an image with a variable dioptric power, and achieves this by turning light sources of display on and off. Thus, there is no need to use a mechanical drive mechanism or a special optical element. Moreover, employing holographic optical elements for the setting of the dioptric power, an image display apparatus according to the present invention is compact and lightweight. Moreover, an image display apparatus according to the present invention allows instantaneous switching of the dioptric power.

The above-stated and other objects and features of the present invention will become clear from the following description given in conjunction with preferred embodiments with reference to the accompanying drawings.

DETAILED DESCRIPTION OF PREFERRED EMBODIMENTS

Hereinafter, embodiments of the present invention will be described with reference to the drawings.

First Embodiment

Figure 1:
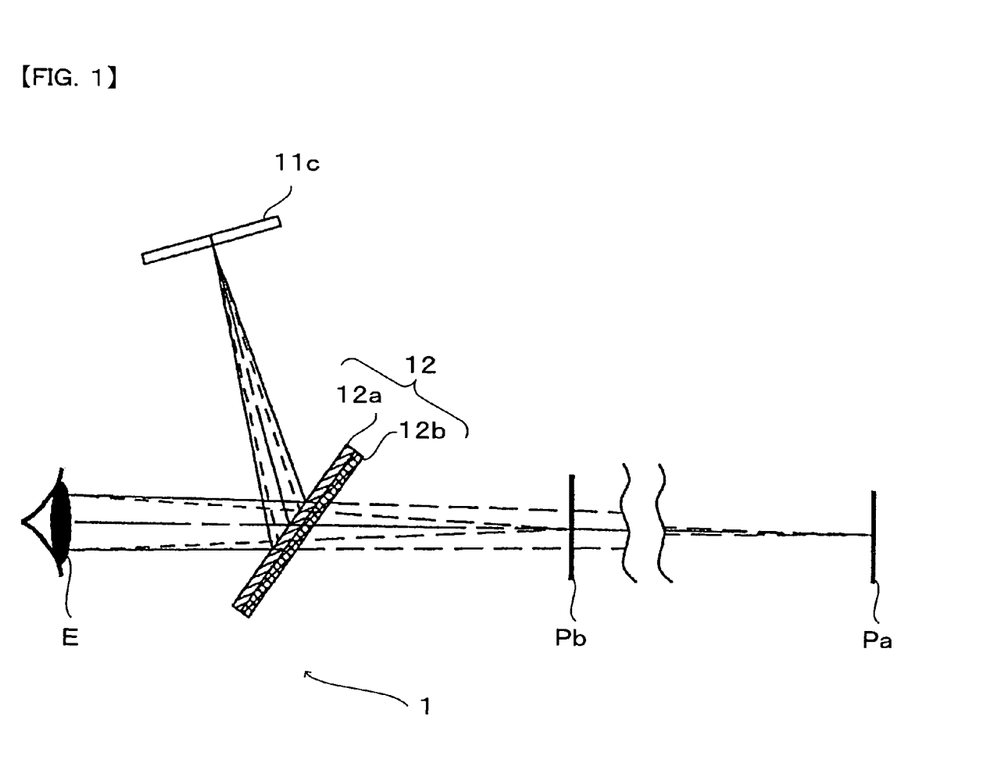
FIG. 1 is a diagram schematically showing the optical construction of the image display apparatus of a first embodiment of the invention.
Figure 2:
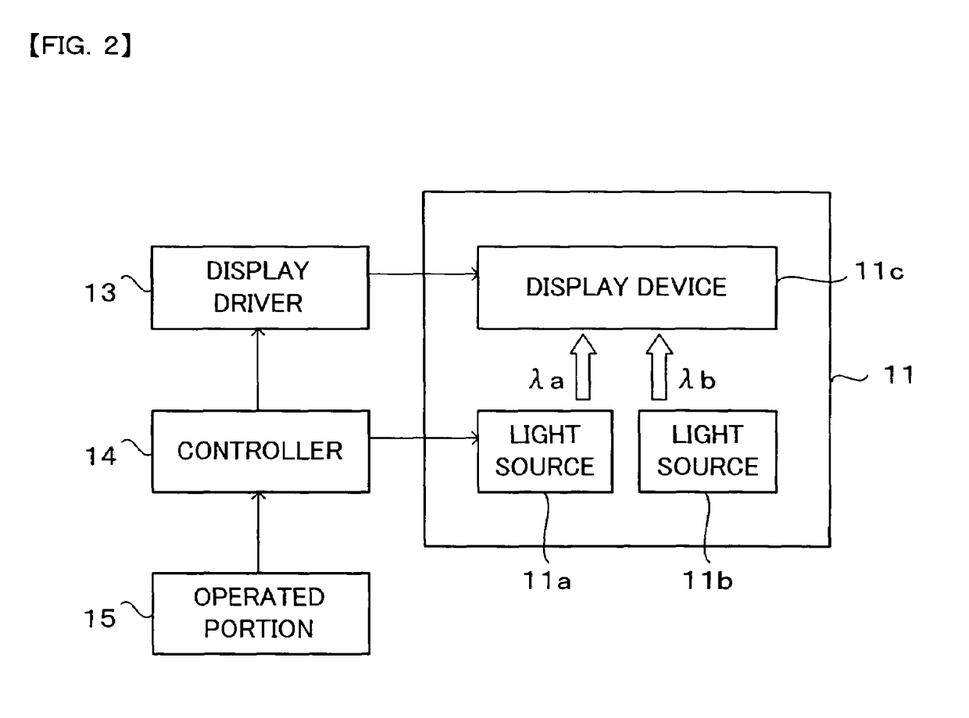
FIG. 2 is a diagram schematically showing the circuit configuration of the image display apparatus of the first embodiment.

FIG. 1 schematically shows the optical construction of the image display apparatus 1 of a first embodiment of the invention. FIG. 2 schematically shows the circuit configuration of the image display apparatus 1 of the first embodiment.

The image display apparatus 1 includes: a display 11 that displays an image; and an observation optical system 12 that directs the image light from the display to an eye E of the user so as to present an enlarged virtual image of the image represented by the image light.

The image display apparatus 1 also includes an attachment (not illustrated) via which the image display apparatus 1 is worn on the head of the user. When the image display apparatus 1 is worn on the head, as shown in FIG. 1, the observation optical system 12 is located right in front of the eye E, and the display 11 is located above the observation optical system 12.

The display 11 includes: a liquid crystal display device (LCD) 11c that produces image light by modulating illumination light fed thereto; and two light sources 11a and 11b (not illustrated in FIG. 1) that feed the illumination light.

The light sources 11a and 11b are, for example, light-emitting diodes (LEDs), and are disposed close to each other.

The light sources 11a and 11b respectively emit a first and a second illumination light having different wavelengths. By selectively making either of the light sources 11a and 11b emit light, the display 11 produces either of a first and a second image light having different wavelengths.

The state of the display 11 can be switched between a first state in which the display 11 produces the first image light (illumination light) and a second state in which the display 11 produces the second image light (illumination light). The wavelength $\lambda$a of the first image light and the wavelength $\lambda$b of the second image light are, for example, 520 nm and 540 nm respectively, and are thus 20 nm or more apart from each other.

The observation optical system 12 is built with two holographic optical elements (HOEs) 12a and 12b. These holographic optical elements 12a and 12b are laid so as to overlap each other, and are disposed on a surface of a holding member (not illustrated).

The first holographic optical element 12a is made by exposing a holographic photosensitive material to light having the same wavelength as the first image light. The second holographic optical element 12b is made by exposing a holographic photosensitive material to light having the same wavelength as the second image light.

The first and second holographic optical elements 12a and 12b both reflect the image light from the display 11 to thereby direct it to the eye E. That is, the first and second holographic optical elements 12a and 12b are both so designed as to present the eye E with an enlarged virtual image of the image represented by the image light.

The only difference is the difference between the distance from the eye E to the virtual image presented by the first holographic optical element 12a and the distance from the eye E to the virtual image presented by the second holographic optical element 12b.

In FIG. 1 is shown the position Pa of the virtual image presented by the first holographic optical element 12a and the position Pb of the virtual image presented by the second holographic optical element 12b. The distance from the eye E to the virtual image position Pa is, for example 5 m, and the distance from the eye E to the virtual image position Pb is, for example 0.3 m. The virtual image position Pb is located on the straight line connecting the eye E to the virtual image position Pa.

Depending on whether the display 11 is in the first state, in which it produces the first image light, or in the second state, in which it produces the second image light, the distance from the eye E to the virtual image position changes. With this change, the dioptric power with which an image is presented to the user is switched.

Generally, a holographic optical element exhibits high wavelength selectivity, and acts only on light within a wavelength range of about 20 nm centering around the design wavelength. The first and second holographic optical elements 12a and 12b exhibit such wavelength selectivity. Thus, the first holographic optical element 12a does not act on the second image light but transmits it, and the second holographic optical element 12b does not act on the first image light but transmits it.

Consequently, when the display 11 is in the first state, only the virtual image at the position Pa is observed, and, when the display 11 is in the second state, only the virtual image at the position Pb is observed.

Moreover, the first and second holographic optical elements 12a and 12b both transmit most of the light from the outside world. Thus, the eye E also receives light from the outside world, allowing the user to observe the outside world superimposed on the presented image (virtual image). That is, the image display apparatus 1 is of the see-through type.

As shown in FIG. 2, the image display apparatus 1 includes a display driver 13, a controller 14, and an operated portion 15.

The display driver 13 drives the liquid crystal display device 11c according to an image signal. The controller 14 controls the driving of the liquid crystal display device 11c by the display driver 13 and the light emission by the light sources 11a and 11b. The operated portion 15 is operated by the user to transmit instructions from the user to the controller 14. Instructions from the user include: those requesting the starting and ending of image display, and those for requesting the switching of the display 11 between the first and second states.

When an instruction requesting the display 11 to be brought into the first state is given, the controller 14 makes only the light source 11a emit light. By contrast, when an instruction requesting the display 11 to be brought into the second state is given, the controller 14 makes only the light source 11b emit light. This allows the wavelength of the image light to be switched, and thus allows the distance from the eye E to the virtual image (and hence the dioptric power) to be switched.

Thus, the user can choose to bring the display 11 into the first state when looking at a far distance and into the second state when looking at a close distance. This allows the user to observe the presented image with a dioptric power close to that which is appropriate for the part of the outside world on which the user is focusing his or her attention. This lessens the strain on the eyes.

In the image display apparatus 1, the first holographic optical element 12a, which presents the virtual image at the farther position, is disposed closer to the eye E than is the second holographic optical element 12b, which presents the virtual image at the closer position. Alternatively, it is also possible to adopt a reversed arrangement.

Second Embodiment

A second embodiment of the invention will be described below. In the following description, such members in the second embodiment as find their functional counterparts in the first embodiment are identified with common reference numerals, and their explanations will not be repeated.

Figure 3:
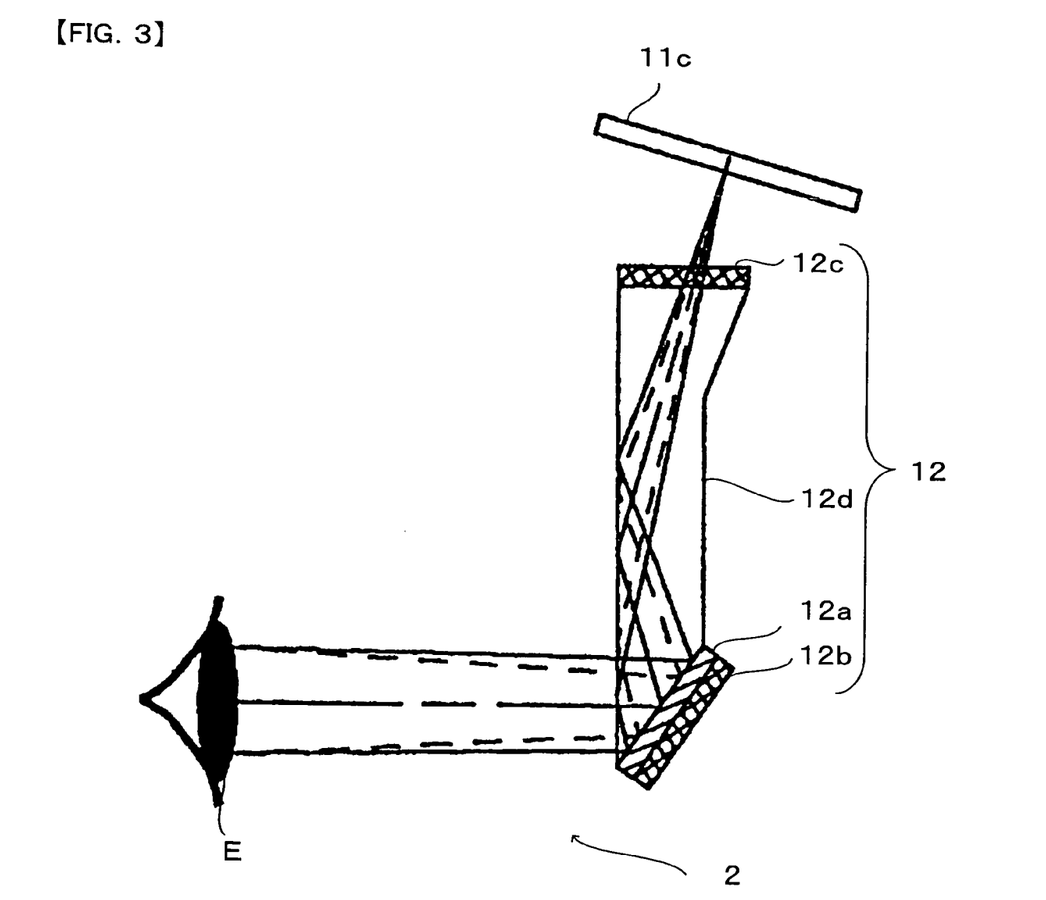
FIG. 3 is a diagram schematically showing the optical construction of the image display apparatus of a second embodiment of the invention.

FIG. 3 schematically shows the optical construction of the image display apparatus 2 of the second embodiment. This image display apparatus 2 is a modified version of the image display apparatus 1 of the first embodiment. Specifically, the image display apparatus 2 includes: three holographic optical elements in total, namely a holographic optical element 12a, a holographic optical element 12b, and a holographic optical element 12c; and an observation optical system 12 built with a prism 12d.

Here, the first and second holographic optical elements 12a and 12b are the same as those used in the image display apparatus 1, and the display 11 is the same as the one used in the image display apparatus 1.

The prism 12d serves to support the holographic optical elements 12a and 12b, and also serves to direct the image light from the display 11 to the holographic optical elements 12a and 12b. The image light from the liquid crystal display device 11c of the display 11 enters the prism 12d through the top surface of the prism 12d, is then totally reflected on a side surface of the prism 12d, and then reaches the holographic optical elements 12a and 12b disposed on the bottom surface (slanted surface) of the prism 12d.

The first and second holographic optical elements 12a and 12b are located close to each other. Moreover, they are so designed as to present virtual images at different distances from the eye E, and thus have different focal lengths. Consequently, unless there is provided another optical member having an optical power, the sizes of the virtual images presented by the first and second holographic optical elements 12a and 12b differ as do the focal lengths.

The third holographic optical element 12c corrects the magnification factor of the second holographic optical element 12b to make the size of the virtual image presented by the second holographic optical element 12b equal to the size of the virtual image presented by the first holographic optical element 12a.

To enable the third holographic optical element 12c to act as described above, it is disposed away from the first and second holographic optical elements 12a and 12b. Specifically, the holographic optical element 12c is disposed on the top surface of the prism 12d.

Moreover, the third holographic optical element 12c acts only on the second image light from the display 11. To achieve this, the holographic optical element 12c is made by exposing a holographic photosensitive material to light having the same wavelength kb as the second image light (illumination light).

In the image display apparatus 2 of this embodiment, the third holographic optical element 12c corrects the magnification factor of the second holographic optical element 12b. Alternatively, it is also possible to construct the image display apparatus 2 in such a way that the magnification factor of the first holographic optical element 12a is corrected.

Third Embodiment

A third embodiment of the invention will be described below. In the following description, such members in the third embodiment as find their functional counterparts in the first and second embodiments are identified with common reference numerals, and their explanations will not be repeated.

Figure 4:
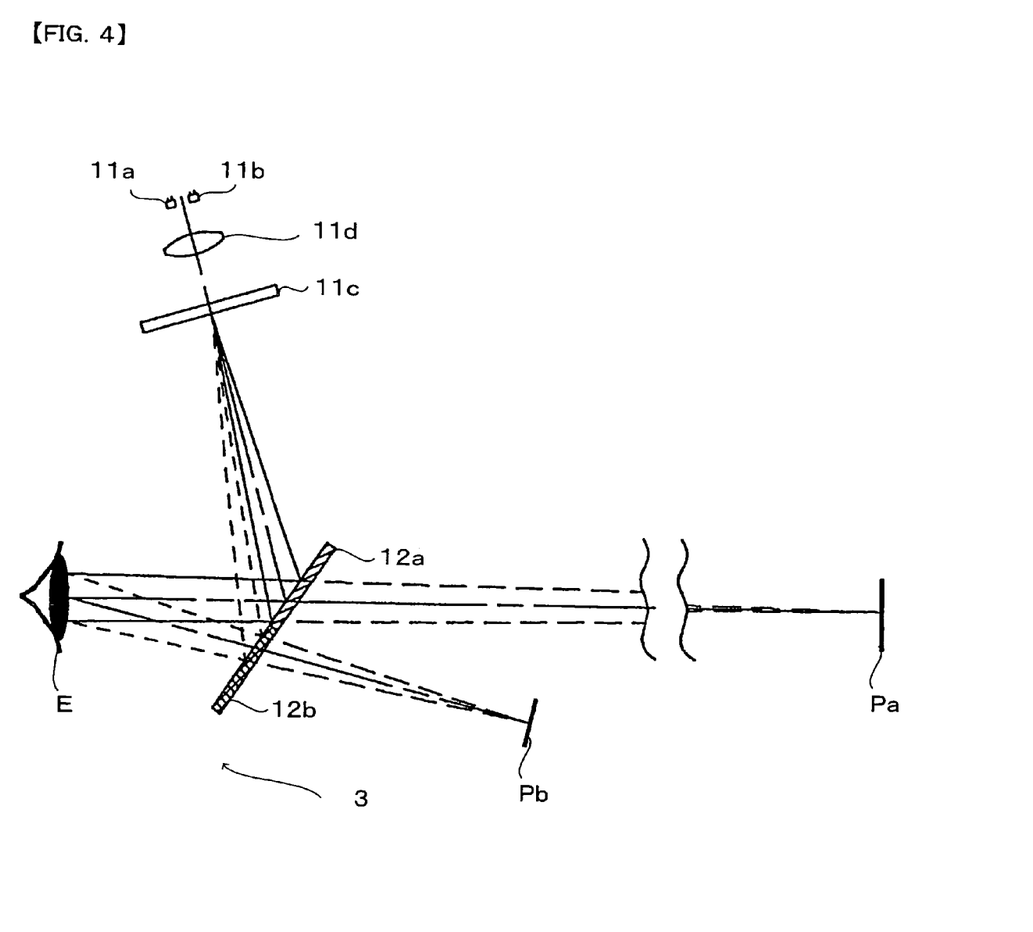
FIG. 4 is a diagram schematically showing the optical construction of the image display apparatus of a third embodiment of the invention.
Figure 5A:
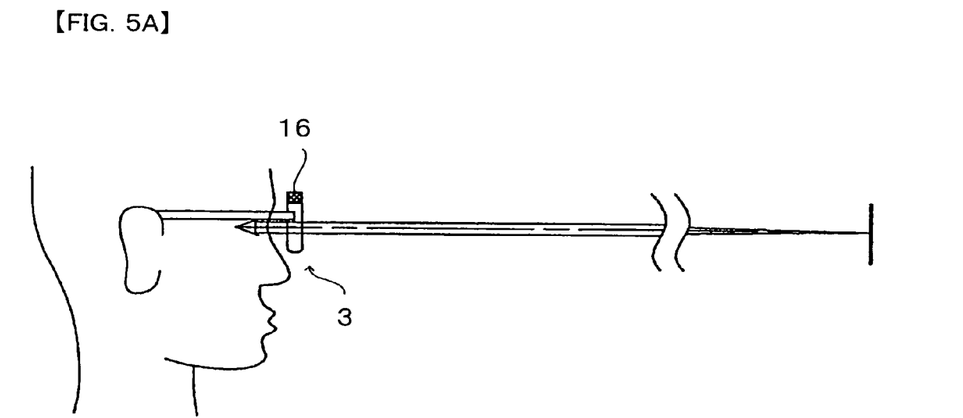
FIG. 5A is a diagram showing a state in which the user wearing the image display apparatus of the third embodiment on the head is looking at a far distance.
Figure 5B:
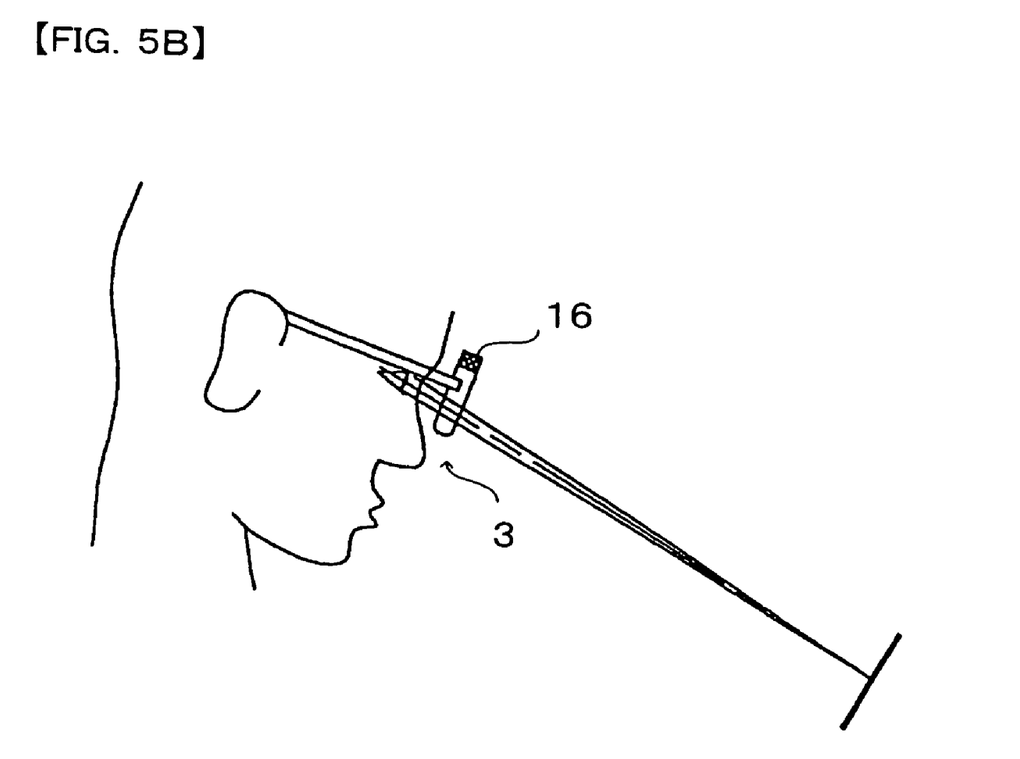
FIG. 5B is a diagram showing a state in which the user wearing the image display apparatus of the third embodiment on the head is looking at a close distance.

FIG. 4 schematically shows the optical construction of the image display apparatus 3 of the third embodiment. FIGS. 5A and 5B show states of the image display apparatus 3 worn on the head of the user. Whereas the image display apparatuses 1 and 2 of the first and second embodiments both present a monochrome image, this image display apparatus 3 presents a color image.

Moreover, whereas the image display apparatuses 1 and 2 have the virtual image position Pb of the second image light located on the straight line connecting the eye E to the virtual image position Pa of the first image light, the image display apparatus 3 has the virtual image position Pb located slightly below the straight line connecting the eye E to the virtual image position Pa.

To achieve presentation of a color image, the light source 11a for producing the first illumination light is provided with a light source that emits light in the wavelength range of red light, a light source that emits light in the wavelength range of green light, and a light source that emits light in the wavelength range of blue light; likewise, the light source 11b for producing the second illumination light is provided with a light source that emits light in the wavelength range of red light, a light source that emits light in the wavelength range of green light, and a light source that emits light in the wavelength range of blue light.

Here, however, the wavelength of the red light emitted from the light source 11a differs from the wavelength of the red light emitted from the light source 11b; the wavelength of the green light emitted from the light source 11a differs from the wavelength of the green light emitted from the light source 11b; and the wavelength of the blue light emitted from the light source 11a differs from the wavelength of the blue light emitted from the light source 11b.

For example, the light emitted from the light source 11a has wavelengths of 620 nm (red), 520 nm (green), and 450 nm (blue), and the light emitted from the light source 11b has wavelengths of 640 nm (red), 540 nm (green), and 470 nm (blue).

The first holographic optical element 12a presents virtual images of the color component images represented by the light of the different wavelengths contained in the first image light on the same plane (position Pa) at the same magnification factor. Likewise, the second holographic optical element 12b presents virtual images of the color component images represented by the light of the different wavelengths contained in the second image light on the same plane (position Pb) at the same magnification factor.

The first holographic optical element 12a is made by laying together three holographic photosensitive materials each individually exposed to light of one of the same three wavelengths of the light contained in the first image light. The second holographic optical element 12b is made by laying together three holographic photosensitive materials each individually exposed to light of one of the same three wavelengths of the light contained in the second image light.

The first and second holographic optical elements 12a and 12b may each be made through multiple exposure of a holographic photosensitive material having a wide photosensitive wavelength range to light of each of the same three wavelengths of the light contained in the first or second image light.

To allow the virtual image position Pb to be located below the straight line connecting the eye E to the virtual image position Pa, the first and second holographic optical elements 12a and 12b are disposed side by side on the same surface of a holding member (not illustrated) in such a way that the latter (12b) is located below the former (12a) and that the two are contiguous with each other.

Moreover, the light sources 11a and 11b are disposed away from each other, one in front of the other. This allows the liquid crystal display device 11c to direct most of the illumination light from the light source 11a to the first holographic optical element 12a and most of the illumination light from the light source 11b to the second holographic optical element 12b. This helps reduce the loss of light. Between the light sources 11a and 11b and the liquid crystal display device 11c, an illumination lens 11d is disposed.

When the display 11 is in the first state, the illumination light from the light source 11a passes through the illumination lens 11d and strikes the liquid crystal display device 11c to become the first image light. Most of this image light reaches the first holographic optical element 12a, while part of the image light reaches the second holographic optical element 12b.

The first holographic optical element 12a then reflects all the first image light that has reached it to thereby direct it to the eye E so that an enlarged virtual image of the color image represented by the first image light is presented at the position Pa. On the other hand, the second holographic optical element 12b does not act on the first image light that has reached it, and thus transmits and thereby discard it.

When the display 11 is in the second state, the illumination light from the light source 11b passes through the illumination lens 11d and strikes the liquid crystal display device 11c to become the second image light. Most of this image light reaches the second holographic optical element 12b, while part of the image light reaches the first holographic optical element 12a.

The second holographic optical element 12b then reflects all the second image light that has reached it to thereby direct it to the eye E so that an enlarged virtual image of the color image represented by the second image light is presented at the position Pb. On the other hand, the first holographic optical element 12a does not act on the second image light that has reached it, and thus transmits and thereby discard it.

As shown in FIGS. 5A and 5B, the image display apparatus 3 is shaped like common eye glasses, and is easy to wear on. FIG. 5A shows a state in which the user is looking at a far distance, and FIG. 5B shows a state in which the user is looking at a distance around his or her own hands.

The image display apparatus 3 includes a posture detector 16 that detects the posture of the user. The output of the posture detector 16 is fed to the controller 14 so as to be used to switch the display 11 between the first and second states. Thus, the circuit of the image display apparatus 3 is configured to include all of what is shown in FIG. 2 plus the posture detector 16.

Instead, the operated portion 15 includes no member that accepts instructions requesting the switching of the state of the display 11. In the image display apparatus 3, according to the result of the detection by the posture detector 16, the display 11 is automatically switched between the first and second states.

The posture detector 16 is built with a level sensor that detects inclination relative to the horizontal direction. The posture detector 16 detects the forward/backward inclination of the user's head.

When the angle at which the head is inclined forward-downward relative to the horizontal direction is smaller than or equal to a predetermined angle, the operated portion 15 brings the display 11 into the first state (makes only the light source 11a emit light) so that the virtual image is presented at the farther position Pa. When the angle at which the head is inclined forward-downward relative to the horizontal direction is greater than the predetermined angle, the operated portion 15 brings the display 11 into the second state (makes only the light source 11b emit light) so that the virtual image is presented at the closer position Pb.

The above-mentioned predetermined angle across which the display 11 is switched between the first and second states is typically in the range of 30° to 45°. This predetermined angle may be made variable so that the user can set it via the operated portion 15.

When the user looks at a distance around his or her own hands, the user most likely intends to read some form of writing composed of letters or the like. In such cases, if the presented image (virtual image) overlaps the focus of the user's attention, it may make it difficult for the user to recognize letters. To avoid this, the image display apparatus 3 has the virtual image position Pb located slightly below. Consequently, even when the user looks at a distance around his or her own hands, the presented image does not overlap the focus of the user's attention, and thus does not hinder the user from recognizing letters and the like.

The embodiments described above all deal with cases in which as a device for displaying an image and producing image light is used a liquid crystal display device 11c, which achieves the purpose by modulating illumination light. Alternatively, it is also possible to use a device that itself emits image light, like an electroluminescence (EL) device.

With any of the image display apparatuses 1 to 3 of the embodiments described above, two of it may be provided in a pair so that an image is presented to both eyes. Since the image display apparatuses 1 to 3 are all of the see-through type, doing so does not lessen safety. Even in cases where an image is presented to both eyes, no more than one posture detector 16 needs to be provided.

Put otherwise, an image display apparatus according to the present invention like those described above can be described as follows.

In an image display apparatus according to the invention, a first holographic optical element and a second holographic optical element are so designed as to transmit light from the outside world and direct it to an eye of the user.

This makes it possible to realize a see-through apparatus that is usable in daily life. Moreover, since the apparatus allows an image to be presented with a variable dioptric power, its use in daily life does not unnecessarily strain the user's eyes.

In the image display apparatus according to the invention, the first holographic optical element and the second holographic optical element are advisably disposed on the same surface of the same member.

This eliminates the need to hold the holographic optical elements individually. Thus, it is possible to simplify the construction and make size and weight reduction easier.

In this case, in the image display apparatus according to the invention, it is preferable that a third holographic optical element for making the size of the virtual image presented by the second holographic optical element equal to the size of the virtual image presented by the first holographic optical element be disposed away from the first and second holographic optical elements.

To present virtual images at different distances from the eye, the first and second holographic optical elements need to be given different focal lengths. With the first and second holographic optical elements disposed close to each other, however, the sizes of the virtual images they present differ as do their focal lengths. This is overcome by the provision of the third holographic optical element, which acts only on a second light, away from the first and second holographic optical elements, because the third holographic optical element makes the sizes of the two virtual images equal.

The image display apparatus according to the invention is advisably additionally provided with a detector for detecting the posture of the user so that, according to the posture of the user detected by the detector, a controller switches a display between the first and second states.

This allows the dioptric power to be switched automatically according to the posture of the user, and thus eliminates the need for the user to make some operation to switch the dioptric power. For example, as the posture of the user, the forward/backward inclination of the user's head may be detected so that an appropriate dioptric power is set automatically depending on whether the user is looking at a close or far distance.

The image display apparatus according to the invention may be configured as follows. A first light from the display contains a plurality of lights having different wavelengths and representing different color component images of a color image, and the first holographic optical element presents, superimposed on the same plane, virtual images of the different color component images represented by the plurality of lights contained in the first light. Moreover, a second light from the display contains a plurality of lights having different wavelengths and representing different color component images of a color image, and the second holographic optical element presents, superimposed on the same plane, virtual images of the different color component images represented by the plurality of lights contained in the second light.

When constructed as described above, the image display apparatus according to the invention can present a color image containing a huge amount of information while allowing the switching of the dioptric power.

It should be understood that the embodiments and the like specifically described above are simply meant to clarify the technical idea of the present invention; that is, the present invention can be carried out in any manners other than specifically described above, and many modifications and variations are possible within the scope and spirit of the appended claims.

What is claimed is:

1. An image display apparatus worn on a head of a user, comprising:
    a display that operates either in a first state in which the display displays an image with a first light and a second state in which the display displays an image with a second light having a different wavelength from the first light;
    a first holographic optical element that directs the first light from the display to an eye of the user so that a first virtual image of the image represented by the first light is presented at a first distance from the eye of the user, the first holographic optical element transmitting light from an outside world to the eye of the user;
    a second holographic optical element that directs the second light from the display to the eye of the user so that a second virtual image of the image represented by the second light is presented at a second distance from the eye of the user, the second holographic optical element transmitting light from the outside world to the eye of the user;
    a detector that detects an inclination of the user's head; and
    a controller that switches the display between the first and second states according to the inclination of the user's head detected by the detector to provide one of the first and second virtual images with a corresponding dioptric power.

2. The image display apparatus of claim 1, further comprising:
    a holding member,
    wherein the first and second holographic optical elements are provided on a same surface of the holding member.

3. The image display apparatus of claim 1,
    wherein the second virtual image is located below a line connecting the eye of the user to the first virtual image.

4. An image display apparatus worn on a head of a user, comprising:
- a display that operates either in a first state in which the display displays an image with a first light and a second state in which the display displays an image with a second light having a different wavelength from the first light;
- a first holographic optical element that directs the first light from the display to an eye of the user so that a first virtual image of the image represented by the first light is presented at a first distance from the eye of the user, the first holographic optical element transmitting light from an outside world to direct the light to the eye of the user;
- a second holographic optical element that directs the second light from the display to the eye of the user so that a second virtual image of the image represented by the second light is presented at a second distance from the eye of the user, the second holographic optical element transmitting light from the outside world to direct the light to the eye of the user;
- a controller that switches the display between the first and second states to provide one of the first and second virtual images with a corresponding dioptric power;
- a third holographic optical element that acts only on the second light to make a size of the virtual image presented by the second holographic optical element equal to a size of the virtual image presented by the first holographic optical element, the third holographic optical element being disposed away from the first and second holographic optical elements; and
- a holding member,
- wherein the first and second holographic optical elements are provided on a same surface of the holding member.

5. The image display apparatus of claim 4,
wherein the second virtual image is located on a line connecting the eye of the user to the first virtual image.

6. An image display apparatus worn on a head of a user, comprising:
- a display that operates either in a first state in which the display displays a first color image that is comprised of a plurality of lights having different wavelengths representing different first color component images of the first color image and a second state in which the display displays a second color image that is comprised of a plurality of lights having different wavelengths representing different second color component images of the second color image, the wavelengths for the first color image lights and the second color image lights being different;
- a first holographic optical element that superimposes the first color component images of the first color image and directs the first color component images of the first color image to an eye of the user so that a virtual image of the first color image is presented at a first distance from the eye of the user;
- a second holographic optical element that superimposes the second color component images of the second color image and directs the second color component images of the second color image to the eye of the user so that a virtual image of the second color image is presented at a second distance from the eye of the user, the second distance being different from the first distance; and
- a controller that switches the display between the first and second states.

7. The image display apparatus of claim 6, further comprising:
- a holding member,
- wherein the first and second holographic optical elements are provided on a same surface of the holding member.

8. The image display apparatus of claim 6, further comprising:
- a detector that detects an inclination of the user's head,
- wherein the controller switches the display between the first and second states according to the inclination of the user's head detected by the detector.

9. The image display apparatus of claim 6,
wherein the second virtual image is located below a line connecting the eye of the user to the first virtual image.

10. An image display apparatus worn on a head of a user, of claim 1, comprising:
- a display that operates either in a first state in which the display displays an image with a first light and a second state in which the display displays an image with a second light having a different wavelength from the first light;
- a first holographic optical element that directs the first light from the display to an eye of the user so that a first virtual image of the image represented by the first light is presented at a first distance from the eye of the user, the first holographic optical element transmitting light from an outside world to direct the light to the eye of the user;
- a second holographic optical element that directs the second light from the display to the eye of the user so that a second virtual image of the image represented by the second light is presented at a second distance from the eye of the user, the second holographic optical element transmitting light from the outside world to direct the light to the eye of the user;
- a controller that switches the display between the first and second states to provide one of the first and second virtual images with a corresponding dioptric power;
- a prism having a first surface and a second surface; and
- a third holographic optical element that is provided on the first surface of the prism and acts only on the second light to make a size of the virtual image presented by the second holographic optical element equal to a size of the virtual image presented by the first holographic optical element,
- wherein the first and second holographic optical elements are provided on the second surface of the prism.

11. The image display apparatus of claim 10,
wherein the second virtual image is located on a line connecting the eye of the user to the first virtual image.

12. An image display apparatus worn on a head of a user, comprising:
- display that operates either in a first state in which the display an image with a first light and a second state in which the display displays an image with a second light having a different wavelength from the first light;
- a first holographic optical element that directs the first light from the display to an eye of the user so that a first virtual image of the image represented by the first light is presented at a first distance from the eye of the user, the first holographic optical element transmitting light from an outside world to direct the light to the eye of the user;
- a second holographic optical element that directs the second light from the display to the eye of the user so that a second virtual image of the image represented by the second light is presented at a second distance from the eye of the user, the second holographic optical element transmitting light from the outside world to direct the light to the eye of the user;
- a third holographic optical element that acts only on the second light to make a size of the virtual image presented by the second holographic optical element equal to a size of the virtual image presented by the first holographic optical element, the third holographic optical element being disposed away from the first and second holographic optical elements; and a controller that switches the display between the first and second states to provide one of the first and second virtual images with a corresponding dioptric power.

13. The image display apparatus of claim 12, wherein the second virtual image is located on a line connecting the eye of the user to the first virtual image.

14. An image display apparatus worn on a head of a user, comprising:

a display that operates either in a first state in which the display displays an image with a first light and a second state in which the display displays an image with a second light having a different wavelength from the first light;

a first holographic optical element that directs the first light from the display to an eye of the user so that a first virtual image of the image represented by the first light is presented at a first distance from the eye of the user, the first holographic optical element transmitting light from an outside world to direct the light to the eye of the user;

a second holographic optical element that directs the second light from the display to the eye of the user so that a second virtual image of the image represented by the second light is presented at a second distance from the eye of the user, the second holographic optical element transmitting light from the outside world to direct the light to the eye of the user; and a controller that switches the display between the first and second states to provide one of the first and second virtual images with a corresponding dioptric power, wherein the second virtual image is located below a line connecting the eye of the user to the first virtual image.

15. The image display apparatus of claim 14, further comprising:

a holding member, wherein the first and second holographic optical elements are provided on a same surface of the holding member.

* * * * *

UNITED STATES PATENT AND TRADEMARK OFFICE
CERTIFICATE OF CORRECTION

PATENT NO.       : 7,502,153 B2                                  Page 1 of 1
APPLICATION NO.  : 11/168586
DATED            : March 10, 2009
INVENTOR(S)      : Yoshie Shimizu

It is certified that error appears in the above-identified patent and that said Letters Patent is hereby corrected as shown below:

<u>Column 12</u>:
lines 13-14, delete "An image display apparatus worn on a head of a user, of claim 1, comprising:" and
insert -- An image display apparatus worn on a head of a user, comprising: --.

lines 49-50, delete "display that operates either in a first state in which the display an image with a first light and a second state in" and
insert -- a display that operates either in a first state in which the display displays an image with a first light and a second state in --.

Signed and Sealed this

Fourteenth Day of April, 2009

JOHN DOLL
*Acting Director of the United States Patent and Trademark Office*